(12) United States Patent
Ni et al.

(10) Patent No.: US 11,662,026 B2
(45) Date of Patent: May 30, 2023

(54) SEAL WITH SURFACE INDENTS

(71) Applicant: Hamilton Sundstrand Corporation, Charlotte, NC (US)

(72) Inventors: Weishun William Ni, Rockton, IL (US); Edward W. Goy, Crystal Lake, IL (US); James Harder, Monroe Center, IL (US)

(73) Assignee: Hamilton Sandstrand Corporation, Charlotte, NC (US)

( * ) Notice: Subject to any disclaimer, the term of this patent is extended or adjusted under 35 U.S.C. 154(b) by 0 days.

(21) Appl. No.: 17/403,062

(22) Filed: Aug. 16, 2021

(65) Prior Publication Data

US 2023/0048539 A1    Feb. 16, 2023

(51) Int. Cl.
*F16J 15/40*          (2006.01)

(52) U.S. Cl.
CPC ...................... *F16J 15/40* (2013.01)

(58) Field of Classification Search
CPC ...... F16J 15/34; F16J 15/3404; F16J 15/3408; F16J 15/3412; F16J 15/3424; F16J 15/40
See application file for complete search history.

(56) References Cited

U.S. PATENT DOCUMENTS

| | | | |
|---|---|---|---|
| 3,632,240 A | 1/1972 | Dworak | |
| 4,105,267 A | 8/1978 | Mori | |
| 5,941,532 A | 8/1999 | Flaherty et al. | |
| 6,095,690 A | 8/2000 | Niegel et al. | |
| 8,708,567 B2 | 4/2014 | Lee | |
| 10,060,430 B2 | 8/2018 | Ishii et al. | |
| 2008/0100001 A1* | 5/2008 | Flaherty | F16J 15/3412 277/400 |
| 2008/0273825 A1 | 11/2008 | Morales et al. | |
| 2014/0255234 A1 | 9/2014 | Schumann | |
| 2017/0175736 A1 | 6/2017 | Craig et al. | |
| 2019/0101117 A1 | 4/2019 | Ikeda et al. | |
| 2020/0224722 A1* | 7/2020 | Imura | F16C 33/107 |
| 2020/0224768 A1* | 7/2020 | Imura | F16J 15/3412 |

(Continued)

FOREIGN PATENT DOCUMENTS

| | | |
|---|---|---|
| EP | 1918617 A1 | 5/2008 |
| EP | 2295802 A2 | 3/2011 |
| JP | H1150974 A | 2/1999 |

OTHER PUBLICATIONS

V. Brizmer, et al., "A Laser Surface Textured Parallel Thrust Bearing", from Tribology Transactions vol. 46 (Jul. 2003), pp. 397-403.

(Continued)

*Primary Examiner* — Gilbert Y Lee
(74) *Attorney, Agent, or Firm* — Kinney & Lange, P.A.

(57) ABSTRACT

A seal assembly for preventing the flow of fluid includes a rotating component having a first sealing surface, a stationary component coaxial with the rotating component and having a second sealing surface with the second sealing surface configured to form a seal with the first sealing surface of the rotating component, and indents in one of the first sealing surface and the second sealing surface. The indents are configured to control a width of a gap between the first sealing surface and the second sealing surface to allow fluid to flow into the gap. At least two of the indents are at least partially aligned in the radial direction.

19 Claims, 4 Drawing Sheets

(56) References Cited

U.S. PATENT DOCUMENTS

2020/0332901 A1\* 10/2020 Imura ................. F16J 15/3412
2022/0196013 A1     6/2022 Goy et al.

OTHER PUBLICATIONS

Extended European Search Report for EP Application No. 22188158.4, dated Dec. 7, 2022, 8 pages.
Extended European Search Report for EP Application No. 22187336.7, dated Jan. 3, 2023, 8 pages.

\* cited by examiner

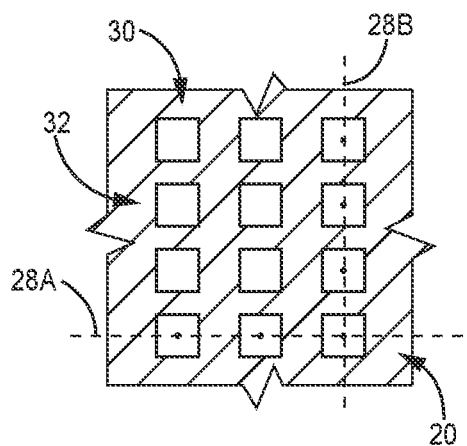
FIG. 5A
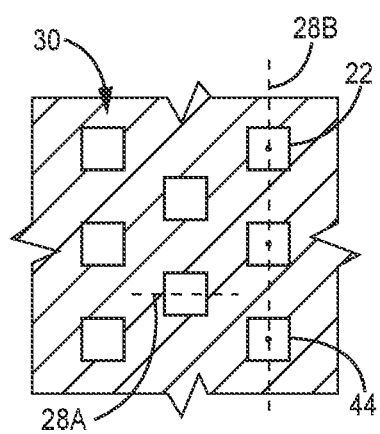
FIG. 5B
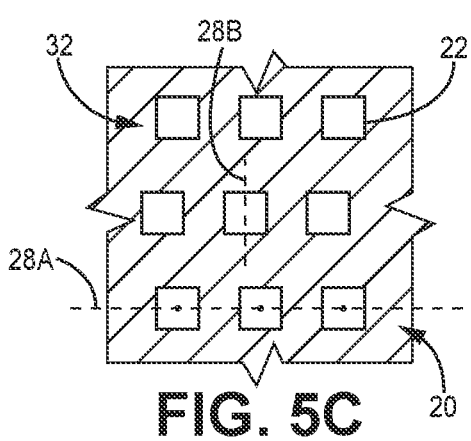
FIG. 5C
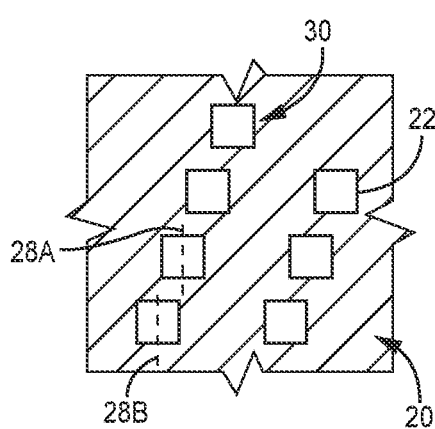
FIG. 5D
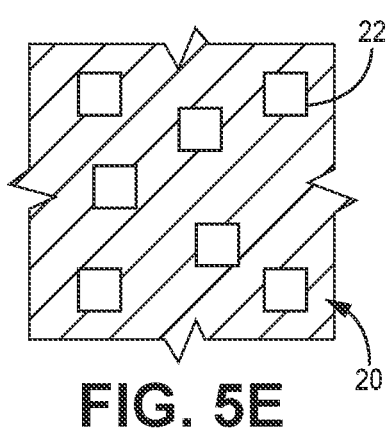
FIG. 5E
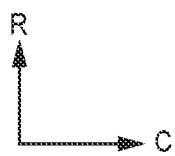

SEAL WITH SURFACE INDENTS

FIELD OF THE INVENTION

The present invention relates to seal assemblies in a gas turbine engine and, in particular, to indents on the rotating component or stationary component of a seal to control a fluid film thickness between the two components.

BACKGROUND

Conventional contacted surface seals and other types of seal arrangements are used to minimize or prevent leakage of fluid between a stationary component and a rotating component. Wear damage can result from contact between the stationary component and the rotating component. Thus, a configuration in which the two components are non-contacted with an optimized lubrication film gap between the two components is desired. However, if the gap between the stationary component and rotating component is too large, leakage of fluid between the two components through the seal can occur.

SUMMARY

A seal assembly for preventing the flow of fluid includes a rotating component having a first sealing surface, a stationary component coaxial with the rotating component and having a second sealing surface with the second sealing surface configured to form a seal with the first sealing surface of the rotating component, and indents in one of the first sealing surface and the second sealing surface. The indents are configured to control a thickness of the fluid lubrication film between the first sealing surface and the second sealing surface (which creates a hydrodynamic pressure via turbulent vortex flow of the fluid, which in turn creates a lift separation force to form a gap within which the fluid is located) to minimize fluid flow into the gap without causing wear on the first sealing surface and the second sealing surface. At least two of the indents are at least partially aligned in the radial direction.

A method of sealing a gap between a stationary component and a rotating component includes rotating the rotating component adjacent the stationary component with the rotating component having a first sealing surface positioned to interact with a second sealing surface on the stationary component. One of the first sealing surface and the second sealing surface includes indents with at least two of the indents being at least partially aligned in a radial direction. The method further includes sealing the gap between the first sealing surface and the second sealing surface due to the indents creating a hydrodynamic pressure by generating lift separation force to size the gap to allow a fluid between the first sealing surface and second sealing surface but minimize the fluid from flowing completely radially across the gap.

BRIEF DESCRIPTION OF THE DRAWINGS

FIGS. 5A-5E are plan views of various configurations of indent patterns on the stationary component or the rotating component.

Figure 1:
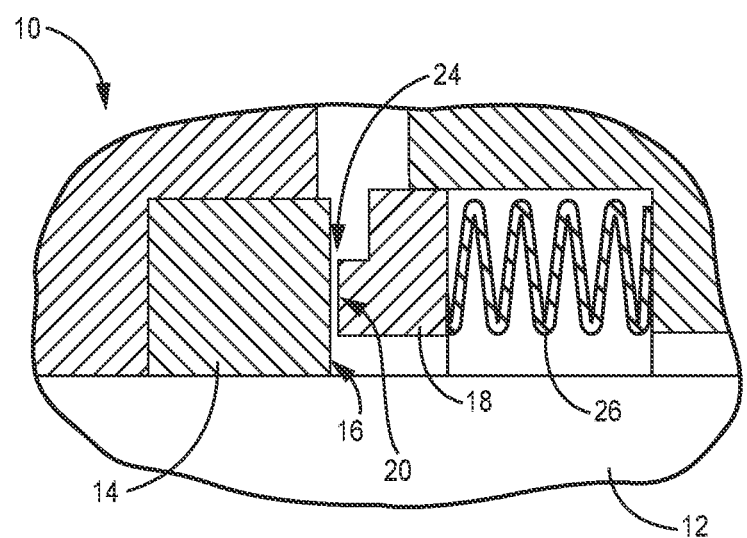
FIG. 1 is a cross-sectional view of a seal assembly having a stationary component and a rotating component.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A seal assembly, such as a ring seal or conventional contacted surface seal, is disclosed herein that includes a stationary component and a rotating component. The rotating component includes a first sealing surface, while the stationary component includes a second sealing surface that interacts with the first sealing surface to form a seal. The first sealing surface and/or the second sealing surface can include indents having various cross-sectional shapes, surface shapes, amounts, total surface areas, and surface configurations/orientations of indent patterns to create a separation force/hydrodynamic pressure on a fluid to create a fluid film thickness a gap between the first sealing surface and the second sealing surface. The separation force, which is created by the indents producing local hydrodynamic pressure by turbulent vortex flow of the fluid within the gap between the first surface and the second surface, is controlled to provide a fluid film thickness (which in turn creates gap that allows for the fluid to flow therein) so that the stationary component and rotating component do not contact one another but substantially reduces the lubrication fluid flowing entirely across the stationary component and the rotating component to leak through the seal (i.e., leak through the lubricated first sealing surface and second sealing surface).

The fluid film thickness produced by the indents on either the first sealing surface or the second sealing surface prevent contact between the stationary component and the rotating component, thereby reducing the likelihood of damage that could occur if contact were to happen by an increased loading force and/or high rotating speed conditions. The prevention of contact increases the seal assembly operating life. Additionally, the production of turbulent flow of fluid to cause a hydrodynamic pressure/separation force to control a width of the fluid film thickness between the two components ensures that the fluid film is at the appropriate thickness to allow the fluid to be present therein to provide lubrication but not allow the fluid to flow across the entirety of the gap to leak through the seal (due to fluid adhesion). Because the fluid is present between the first sealing surface and the second sealing surface to provide lubrication to reduce temperatures (without leaking across the seal), materials can be used for the stationary component and/or rotating component that are more durable but may be less capable of handling high temperatures and not used for sealing in prior art seal assemblies. Thus, the indents allow for the use of materials that can extend the operating life of the seal components. These and other advantages will be realized in the below disclosure.

Figure 2:
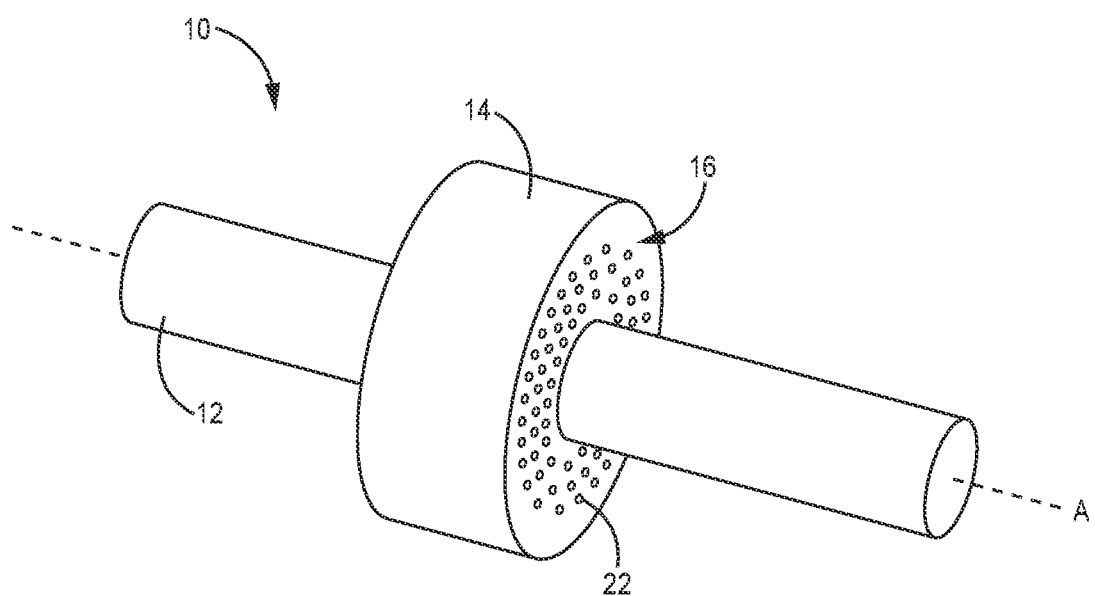
FIG. 2 is a perspective view of the rotating component of FIG. 1, illustrating indents in the rotating component.

FIG. 1 is a cross-sectional view of a seal assembly having a stationary component and a rotating component, while FIG. 2 is a perspective view of the rotating component having indents. Seal assembly 10 includes shaft 12 rotatable about axis A (see FIG. 2), rotating component 14 having first sealing surface 16, stationary component 18 having second sealing surface 20, indents 22, gap 24 (within which a fluid film is present), and biasing member 26.

Seal assembly 10 is configured to seal an interface between rotating component 14 and stationary component 18. Rotating component 14 and stationary component 18 can be any two components that move relative to one another between which a seal is desired to prevent fluid from flowing entirely therebetween, such as components in a fuel pump of a gas turbine engine. For example, fluid can be present in an area radially outward from rotating component 14 and stationary component 18, and seal assembly 10 is configured to prevent the fluid from flowing through gap 24 between rotating component 14 and stationary component 18 to enter an area radially inward. In other embodiments, rotating component 14 can rotate in one direction while stationary component 18 can rotating in an opposite direction with a seal therebetween. Seal assembly 10 can have other configurations and/or can include other components not expressly shown or described herein. For example, seal assembly 10 can have a configuration that is a mirror of the configuration shown in FIG. 1 in which the rotating component 14 is to the right of stationary component 18.

Shaft 12 extends along and is configured to rotated about axis A. Shaft 12 can be one continuous and monolithic component or multiple components fastened together. Shaft 12 can be constructed from any materials suitable for transferring rotational force to rotating component 14 and/or other components. Shaft 12 can be a main shaft, secondary shaft, or another rotating component of a gas turbine engine or other system. Shaft 12 can have any shape and/or configuration, such as a cylinder as shown in FIG. 2. Additionally, shaft 12 can have any diameter suitable for transferring rotational force, and the diameter can be constant along the length of shaft 12 or can be varying depending on the strength requirements of shaft 12.

Rotating component 14 is connected to and rotates in unison with shaft 12. Rotating component 14 can be one continuous and monolithic component with shaft 12, or rotating component 14 and shaft 12 can be two separate components welded or otherwise connected to one another. In the illustrated embodiment, rotating component 14 is centered about axis A and is coaxial with shaft 12 and stationary component 18. Rotating component 14, as shown in FIG. 2, is annular in shape, but rotating component 14 can have other shapes and/or configurations, such as being frustoconical with a varying diameter, having a stairstep with portions having different diameters, and/or having cutouts on a radially outer surface.

Rotating component 14 includes first sealing surface 16 on an axial side near stationary component 18. First sealing surface 16 extends circumferentially around the axial side of rotating component 14, and can be the entirety of the axial side of rotating component 14 or can be a portion of the axial side, such as a middle radial portion that is spaced from a radial inner edge of rotating component 14 and a radial outer edge of rotating component 14. First sealing surface 16, along with second sealing surface 20 of stationary component 18, forms a seal to prevent a fluid from flowing entirely through/across gap 24. First sealing surface 16 can be constructed from the same material as rotating component 14, or can be constructed from a different material with first sealing surface 16 being fastened to rotating component 14.

Stationary component 18 is stationary relative to rotating component 14 (i.e., does not rotate together with rotating component 14). Stationary component 18 can be coaxial with shaft 12 and rotating component 14. Stationary component 18 can be annular in shape as disclosed herein or can be another shape suitable for providing a seal with rotating component 14, such as being frustoconical with a varying diameter, having a stairstep with portions having different diameters (as shown in FIG. 1), and/or having cutouts or other features. Stationary component 18 can be spaced from shaft 12, as shown in FIG. 1, or can be adjacent to and/or in contact with shaft 12.

Stationary component 18 includes second sealing surface 20 on an axial side near first sealing surface 16 of rotating component 14. Second sealing surface 20 extends circumferentially around the axial side of stationary component 18, and can be the entirety of the axial side of stationary component 18 or can be a portion of the axial side, such as a middle radial portion that is spaced from a radial inner edge of stationary component 18 and a radial outer edge of stationary component 18. Second sealing surface 20, along with first sealing surface 16 of rotating component 14, forms a seal to prevent fluid from flowing entirely through/across gap 24. Second sealing surface 20 can be constructed from the same material as stationary component 18, or can be constructed from a different material with second sealing component 20 being fastened to stationary component 18. As shown in FIG. 1, second sealing surface 20 can have a smaller radial height than first sealing surface 16. However, second sealing surface 20 can have any height relative to first sealing surface 16, such as a smaller or equal radial height to first sealing surface 16.

Although FIG. 2 illustrates indents 22 as formed in rotating component 14, indents 22 can more generally be formed in either first sealing surface 16 of rotating component 14 or second sealing surface 20 of stationary component 18. Indents 22 are depressions extending into first sealing surface 16 or second sealing surface 20. As is discussed and shown with regards to FIGS. 3A-3E, 4A-4F, and 5A-5E, indents 22 can have any cross-sectional shape, surface shape (i.e., the shape of the individual indent when looking directly at the surface in which the indent extends), number, individual indent surface area, total surface area of all indents 22 combined, and configuration and/or orientation on first sealing surface 16 and/or second sealing surface 20. Indents 22 are shown in FIG. 2 as being on a radially middle portion of first sealing surface 16 of rotating component 14 and extending circumferentially all the way around rotating component 14, but indents 22 can extend radially all the way across first sealing surface 16 and/or be present only along a circumferential portion of first sealing surface 16. While shown only in first sealing surface 16, indents 22 can be in second sealing surface 20 in any size, shape, configuration, orientation, etc. as described in this disclosure with regards to first sealing surface 16, and vice versa. Additionally, indents 22 may have other sizes, shapes, configuration, orientations, etc. that are not expressly described herein. Various shapes, configurations, and orientations are shown and described below with regards to FIGS. 3A-3E, 4A-4F, and 5A-5E.

Indents 22 on either first sealing surface 16 or second sealing surface 20, during operation of seal assembly 10, create hydrodynamic pressure between first sealing surface 16 and second sealing surface 20 by causing turbulent flow of the fluid. The hydrodynamic pressure forms a fluid film thickness (to form gap 24) between rotating component 14 and stationary component 18. Indents 22 control the fluid film thickness (i.e., the size of gap 24) due to the creation of more or less turbulent flow of the fluid located in gap 24 that causes more or less separation force between first sealing surface 16 and second sealing surface 20. The width of gap 24 is controlled by indents 22 having various configurations to cause a specific separation force that can be at least partially balanced by biasing member 26, which biases/pushes stationary component 18 towards rotating component 14. The specific separation force caused by the turbulent flow created by indents 22 creates a width of the fluid film thickness/gap 24 that allows for the fluid to be present within gap 24 (to lubricate first sealing surface 16 and second sealing surface 20) but prevents the fluid from flowing entirely across gap 24 to leak through the seal formed by first sealing surface 16 and second sealing surface 20. In other words, the fluid film thickness/width of gap 24 is sized such that the fluid experiences fluid adhesion (i.e., the fluid molecules stick to each other) to prevent leakage through the seal while also allowing fluid to flow into gap 24 to provide sufficient lubrication between first sealing surface 16 and second sealing surface 20.

Indents 22 can be formed in first sealing surface 16 and second sealing surface 20 using any type of manufacturing method, including molding the components with indents 22 therein and/or mechanically or chemically removing material from the components to form indents 22, such as through laser ablation to evaporate and/or sublimate material from the components by irradiating the component with a laser beam to form indents 22.

Biasing member 26 is adjacent an opposite axial side of second sealing surface 20 of stationary component 18 and can bias/push stationary component 18 towards rotating component 14 to form a seal between first sealing surface 16 and second sealing surface 20. The force imparted by biasing member 26 on stationary component 18 can be chosen to at least partially balance the separation force caused by indents 22 to control the fluid film thickness (i.e., size of gap 24) with a specific width to be wide enough to allow for fluid to be present within gap 24 to lubricate first sealing surface 16 and second sealing surface 20 but to be narrow enough to prevent the fluid from flowing radially entirely through/across gap 24. Biasing member 26 can be a spring, as shown in FIG. 1, or another resilient component configured to impart force on stationary component 18 but compress when stationary component 18 is pushed by the fluid due to the separation force caused by indents 22. Seal assembly 10 can include configurations in which biasing member 26 is not present, such as when stationary component 18 is fixedly attached to a housing or another stationary component relative to rotating component 14.

FIGS. 3A-3E are cross-sectional views of various indent 22 cross-sectional shapes. The cross-sectional shapes of indents 22 shown in FIGS. 3A-3E can be in the circumferential or radial directions such that the fluid film within gap 24 can flow from left to right, right to left, into the page, or out of the page so indents 22 cause turbulent flow of the fluid. Generally, the fluid film within gap 24 will flow at least partially circumferentially in the direction of rotation of rotating component 14. Indents 22 can have any cross-sectional shape, depth (depression into first sealing surface 16 or second sealing surface 20), width (distance from left to right), or length (distance into/out of the page) to produce the desired hydrodynamic pressure and separation force to control the fluid film thickness (i.e., width/size of gap 24). FIGS. 3A-3E describe indents 22 as being located in second sealing surface 20, but indents can also be located in first sealing surface 16.

Figure 3A:
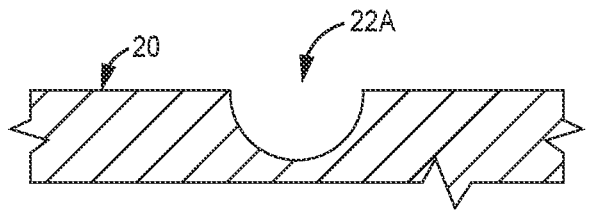
FIGS. 3A-3E are cross-sectional views of various indent cross-sectional shapes.

FIG. 3A shows indent 22A in second sealing surface 20 with indent 22A having a semi-circular cross-sectional shape. Indent 22A can have any radius sufficient to produce a desired hydrodynamic pressure/separation force. Indent 22A can have any length (into/out of the page) forming any surface shape (examples shown in FIGS. 4A-4F). For example, indent 22A can be a semi-sphere with a length equal to the width. In another example, indent 22A can have a length that forms indent 22A with a semi-cylindrical or snake shape. Other embodiments can have indent 22A with a semi-circular cross-sectional shape only at one location along the length of indent 22A with other locations along the length having other cross-sectional shapes.

Figure 3B:
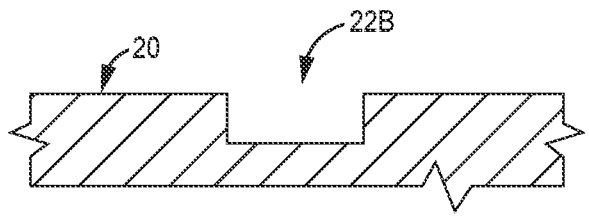

FIG. 3B shows indent 22B in second sealing surface 20 with indent 22B having a rectangular cross-sectional shape. Indent 22B can have any depth, width, and length (forming any surface shape) sufficient to produce a desired separation force. For example, indent 22B can have an equal depth, width, and length to form a square indent 22B. In another example, a length of indent 22B can be greater than a width and/or a depth with the ends of the length of indent 22B being semi-circular to form a stadium surface shape as shown in FIG. 4F. Other embodiments can have indent 22B with a rectangular cross-sectional shape only at one location along the length of indent 22B with other locations along the length having other cross-sectional shapes.

Figure 3C:
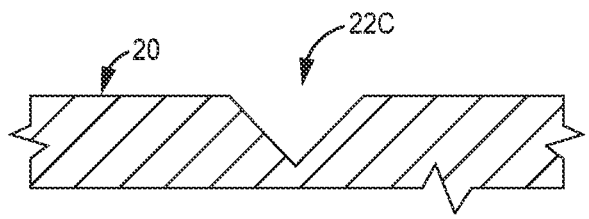

FIG. 3C shows indent 22C in second sealing surface 20 with indent 22C having a triangular cross-sectional shape. Indent 22C is shown in FIG. 3C as being an equilateral triangular cross-sectional shape, but indent 22C can have other configurations of triangles sufficient to produce a desired separation force, such as an isosceles, scalene, obtuse, acute, and right triangle oriented in any direction. Indent 22C can have any length forming any surface shape, with other embodiments of indent 22C having a triangular cross-sectional shape only at one location along the length of indent 22C with other locations along the length having other cross-sectional shapes.

Figure 3D:
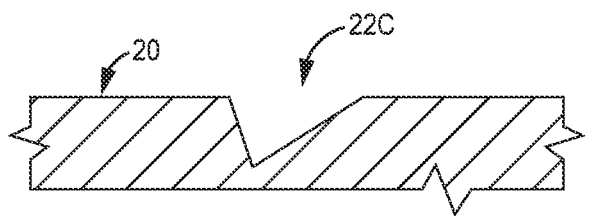

FIG. 3D shows indent 22D in second sealing surface 20 with indent 22D having a wedge cross-sectional shape with the deeper end of indent 22D towards an upstream end (the fluid flow through gap 24 is from left to right). Indent 22D can have any depth, width, and length (forming any surface shape) sufficient to produce a desired separation force. For example, indent 22D can be a right triangular shape with one side of the wedge extending into second sealing surface 20 to form a right angle with second sealing surface 20. In another example, indent 22C (as shown in FIG. 3D) extends into second sealing surface 20 with sides of a triangle that each have different angles with respect to second sealing surface 20. Other embodiments can have indent 22C with a wedge cross-sectional shape only at one location along the length of indent 22C with other locations along the length having other cross-sectional shapes.

Figure 3E:
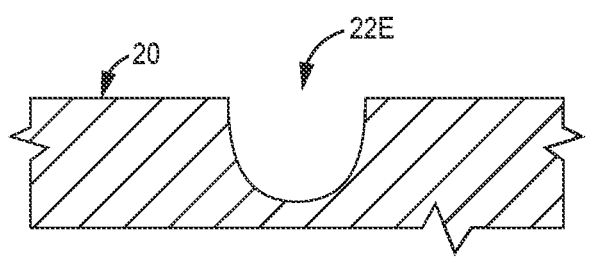

FIG. 3E shows indent 22E in second sealing surface 20 with indent 22E having a semi-elliptical cross-sectional shape. Indent 22E can have any distance to the focal point(s) and/or center sufficient to produce a desired separation force. Indent 22E can be a semi-ellipse with a depth that is greater than a width (as shown in FIG. 3E) or a depth that is less than a width. Indent 22E can have any length (into/out of the page) forming any surface shape. For example, indent 22E can have a surface shape that is an ellipse (as shown in FIG. 4D) or oval (as shown in FIG. 4E). Other embodiments can have indent 22E with a semi-elliptical cross-sectional shape only at one location along the length of indent 22E with other locations along the length having other cross-sectional shapes.

The cross-sectional shapes of indents 22 shown in FIGS. 3A-3E are examples of various cross-sectional shapes of indent 22, and indent 22 can have other cross-sectional shapes not expressly shown or described herein. Additionally, the cross-sectional shapes of indents 22 shown in FIGS. 3A-3E can be combined with any surface shapes shown in FIGS. 4A-4F to form any configuration and/or orientation of indents 22.

FIGS. 4A-4F are plan view of various indent 22 surface shapes extending into first sealing surface 16. The surface shapes (i.e., the shape of the individual indent 22 when looking directly at first sealing surface 16) can be oriented in any direction such that the fluid film flowing within and/or through gap 24 can be from any direction with respect to indent 22. Indents 22 as shown by surface shapes in FIGS. 4A-4F can have any shape, depth, width, or length to produce the desired hydrodynamic pressure/separation force to control the fluid film thickness/size of gap 24. FIGS. 4A-4F describe indents 22 as being located in first sealing surface 16, but indents can also be located in second sealing surface 20. Indents 22 with surface shapes as shown in FIGS. 4A-4F each can have any cross-sectional shape, including the cross-sectional shapes of indents 22A-22E as shown in FIGS. 3A-3E. The cross-sectional shapes shown in FIGS. 3A-3E can be oriented in the top-to-bottom direction, the left-to-right direction, or another orientation relative to FIGS. 4A-4F.

Indents 22 can be measured via the surface area, and indents 22 can have any ratio of surface area to depth (into the page in FIGS. 4A-4F), including a ratio of a surface area of each indent 22 to a depth of that indent 22 between approximately 0.01 and 0.05, with one example having a ratio of approximately 0.012. Additionally, indents 22 can have any width, length, and depth, such as a configuration of indents 22 in which the width is approximately 15 micrometers (0.0006 inches), the length is approximately 51 micrometers (0.002 inches), and the depth is approximately 2.5 micrometers (0.0001 inches).

Figure 4A:
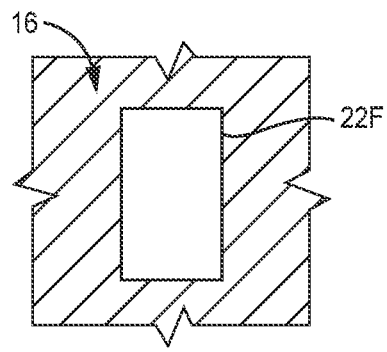
FIGS. 4A-4F are plan views of various indent surface shapes.

FIG. 4A shows indent 22F in first sealing surface 16 with indent 22F having a rectangular surface shape. Indent 22F can have any depth (into the page), width, and length sufficient to produce turbulent flow of the fluid flowing across first sealing surface 16 to cause a desired hydrodynamic pressure/separation force. For example, indent 22F can have an equal depth, width, and length to form a square indent 22F. In another example, a length of indent 22F can be greater than a width (as shown in FIG. 4A) and/or a depth of indent 22F can have a cross-sectional shape that is semi-circular (as shown in FIG. 3A). Other embodiments can include a rectangular surface shape of indents 22F with a cross-sectional shape as shown in any of FIGS. 3A-3E. Additionally, indent 22F can have any cross-sectional shape not expressly disclosed herein, and the cross-sectional shape of indent 22F can be varying along the length and/or width of indent 22F (e.g., a trapezoidal surface shape).

Figure 4B:
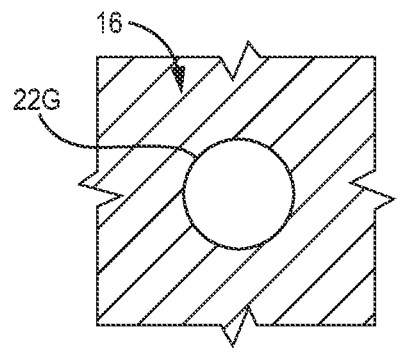

FIG. 4B shows indent 22G in first sealing surface 16 with indent 22G having a circular surface shape. Indent 22G can have any depth, width, and length sufficient to produce turbulent flow of the fluid to cause a desired hydrodynamic pressure/separation force. Because, indent 22G has a circular surface shape, the width is equal to the length. However, the cross-sectional shape of indent 22G can have a variety of shapes, including any of the cross-sectional shapes shown in FIGS. 3A-3E. For example, indent 22G can have a rectangular cross-sectional shape (shown in FIG. 3B) such that the three-dimensional shape of indent 22G is a cylinder. Additionally, indent 22G can have any cross-sectional shape not expressly disclosed herein, and the cross-sectional shape of indent 22G can be varying along the length and/or width of indent 22G.

Figure 4C:
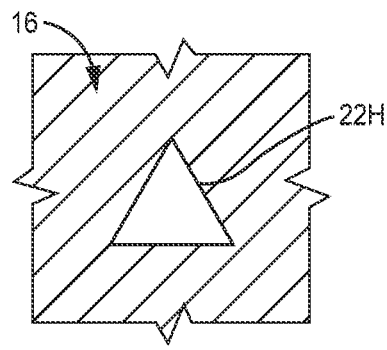
Figure 4D:
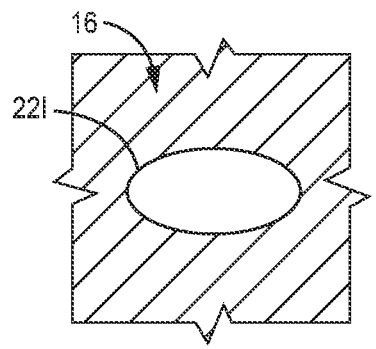
Figure 4E:
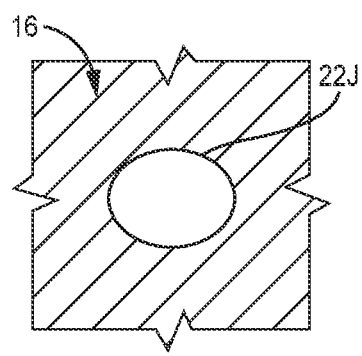
Figure 4F:
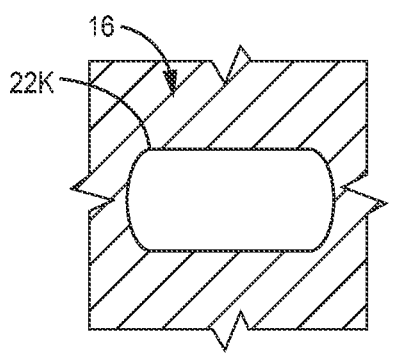

FIG. 4C shows indent 22H in first sealing surface 16 with indent 22H having a triangular surface shape. Indent 22H can have any depth, width, and length sufficient to produce turbulent flow of the fluid to cause a desired hydrodynamic pressure/separation force. For example, indent 22H can have a width that is equal to the length to form an equilateral or right triangle, or indent 22H can have width and length (and angles between the sides) to form another type of triangular surface shape. The cross-sectional shape of indent 22H can have a variety of shapes, including any of the cross-sectional shapes shown in FIGS. 3A-3E. Additionally, indent 22H can have any cross-sectional shape not expressly disclosed herein, and the cross-sectional shape of indent 22H can be varying along the length and/or width of indent 22G.

FIG. 4D shows indent 22I in first sealing surface 16 with indent 22I having an elliptical surface shape. Indent 22I can have any depth, width, and length to form any shape of ellipse sufficient to produce turbulent flow of the fluid to cause a desired hydrodynamic pressure/separation force. For example, indent 22I can have a length that is substantially greater than a width to form a long elliptical surface shape. The cross-sectional shape of indent 22I can have a variety of shapes, including any of the cross-sectional shapes shown in FIGS. 3A-3E. Additionally, indent 22I can have any cross-sectional shape not expressly disclosed herein, and the cross-sectional shape of indent 22I can be varying along the length and/or width of indent 22I.

FIG. 4E shows indent 22J in first sealing surface 16 with indent 22J having an oval surface shape. Indent 22J can have any depth, width, and length to form any shape of oval sufficient to produce turbulent flow of the fluid to cause a desired hydrodynamic pressure/separation force. For example, indent 22J can have a length and a varying width such that the surface shape is narrower at one end than at another. The cross-sectional shape of indent 22J can have a variety of shapes, including any of the cross-sectional shapes shown in FIGS. 3A-3E. Additionally, indent 22J can have any cross-sectional shape not expressly disclosed herein, and the cross-sectional shape of indent 22J can be varying along the length and/or width of indent 22J.

FIG. 4F shows indent 22K in first sealing surface 16 with indent 22K having a stadium surface shape. Indent 22K can have any depth, width, and length to form any stadium shape, include any length and any radius of curvature of the ends of the stadium shape, to produce turbulent flow of the fluid to cause a desired hydrodynamic pressure/separation force. For example, indent 22K can have a length equal to a width with semi-circular ends. The cross-sectional shape of indent 22K can have a variety of shapes, including any of the cross-sectional shapes shown in FIGS. 3A-3E. Additionally, indent 22K can have any cross-sectional shape not expressly disclosed herein, and the cross-sectional shape of indent 22K can be varying along the length and/or width of indent 22K.

FIGS. 5A-5E are plan views of various indent patterns in first sealing surface 16 or second sealing surface 20. In FIGS. 5A-5E as shown, indents 22 are in second sealing surface 20. The configurations/patterns of indents 22 can be oriented in any direction such that the fluid film flowing within and/or through gap 24 can be from any direction with respect to the configurations/patterns of indents 22. For simplicity, FIGS. 5A-5E are oriented such that the radially outward direction R is in the upward direction and the circumferential direction C is to the right. However, the configurations of indents 22 can be in any direction not expressly shown in FIGS. 5A-5E. Additionally, while shown as being rectangular surface shapes, indents 22 in FIGS. 5A-5E can have any surface shape (including adjacent indents 22 having different surface shapes). Further, indents 22 in FIGS. 5A-5E can have any depth and/or cross-sectional shape, including the cross-sectional shapes shown in FIGS. 3A-3E. Adjacent indents 22 can have any radial distance and/or circumferential distance therebetween, including a distance of 0.25 degrees in the circumferential direction and approximately 25 micrometers (0.001 inches) in the radial direction.

FIG. 5A shows a pattern of indents 22 that each include a surface shape radial midpoint 28A, which is a midpoint of each indent 22 as measured in the radial direction, and a surface shape circumferential midpoint 28B, which is a midpoint of each indent 22 as measured in the circumferential direction. The configuration of indent 22 in FIG. 5A include radial columns 30 with circumferential midpoints 28B of indents 22 aligned in the circumferential direction and circumferential rows 32 with radial midpoints 28A of indents 22 aligned in the radial direction. Thus, indents 22 in FIG. 5A are aligned in both the radial and circumferential directions.

FIG. 5B shows a pattern of indents 22 with radial columns 30 that are radially offset from adjacent radial columns 30 such that indents 22 are radially offset from circumferentially adjacent indents 22. Thus, indents 22 in the circumferential direction have radial midpoints 28A that are offset from circumferentially adjacent indents 22. Indents 22 in FIG. 5B can be entirely radially offset such that no portion of indents 22 overlap in the radial direction with circumferentially adjacent indents 22, or indents 22 can be only partially radially offset such that at least a portion of indents 22 overlap in the radial direction with circumferentially adjacent indents 22 (i.e., at least two indents 22 are at least partially aligned in the circumferential direction).

FIG. 5C shows a pattern of indents 22 with circumferential rows 32 that are circumferentially offset from adjacent circumferential rows 32 such that indents 22 are circumferentially offset from radially adjacent indents 22. Thus, in this configuration, indents 22 in the radial direction have circumferential midpoints 28B that are offset from radially adjacent indents 22. Indents 22 in FIG. 5C can be entirely circumferentially offset such that no portion of indents 22 overlap in the circumferential direction with radially adjacent indents 22, or indents 22 can be only partially circumferentially offset such that at least a portion of indents 22 overlap in the circumferential direction with radially adjacent indents 22 (i.e., at least two indents 22 are at least partially aligned in the radial direction).

FIG. 5D shows a pattern of indents 22 with radial columns 30 in which indents 22 are circumferentially offset from adjacent radial indents 22 in each radial column 30. The configuration forms a fan-like array with radial columns 30 extending radially outward at a slant. Indents 22 in each radial column 30 can be entirely circumferentially offset such that no portion of indents 22 overlap in the circumferential direction with radially adjacent indents 22, or indents 22 can be only partially circumferentially offset such that at least a portion of indents 22 overlap in the circumferential direction with radially adjacent indents 22 in that particular radial column 30 (i.e., at least two indents 22 are at least partially aligned in the radial direction).

FIG. 5E shows a pattern of indents 22 with no radial columns and no circumferential rows. Instead, the indents 22 are spaced in the radial and circumferential directions to have any configuration suitable for creating turbulent flow of the fluid to cause a separation force to control the size of gap 24 between first sealing surface 16 and second sealing surface 20. The configuration shown in FIG. 5E can have a pattern that repeats in the circumferential direction while extending around second sealing surface 20, or can have no particular pattern.

Indents 22 in second sealing surface 20 can have a total surface area (i.e., the surface areas of all indents 22 combined) that is between 15 and 25 percent of a total surface area of second sealing surface 20. Similarly, indents 22 in first sealing surface 16 can have a total surface area that is between 15 and 25 percent of a total surface area of first sealing surface 16. This ratio of total surface area of all indents 22 to total surface area of first sealing surface 16 or to total surface area of second sealing surface 20 can provide a turbulent flow of the fluid to cause a hydrodynamic pressure/separation force that produces a fluid film thickness that creates gap 24 that is wide enough to allow fluid to flow into gap 24 to lubricate the two sealing surfaces but narrow enough to prevent the fluid from flowing entirely through gap 24 to leak through the seal. To achieve a desired total surface area of indents 22 in the sealing surfaces, the number of indents 22 can be more than 10,000 depending on the surface shape and size of indents 22.

The fluid film thickness produced by indents 22 on either first sealing surface 16 or second sealing surface 20 prevent contact between stationary component 18 and rotating component 14, thereby reducing the likelihood of damage that could occur if contact were to happen. The prevention of contact increases the operating life of seal assembly 10. Additionally, the control of the fluid film thickness (i.e., the width of gap 24) between the two components 14 and 18 ensures that the fluid filum is at an appropriate thickness to allow the fluid to be present therein to provide lubrication but not allow the fluid to flow across the entirety of gap 24 to leak through the seal (due to fluid adhesion). Because the fluid is present between first sealing surface 16 and second sealing surface 20 to provide lubrication to reduce temperatures (without leaking entirely through gap 24 across the seal), materials can be used for stationary component 18 and/or rotating component 14 that are more durable but may be less capable of handling high temperatures and not used for sealing in prior art seal assemblies. Thus, indents 22 allow for the use of materials that can extend the operating life of the seal components.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A seal assembly for preventing the flow of fluid includes a rotating component having a first sealing surface, a stationary component coaxial with the rotating component and having a second sealing surface with the second sealing surface configured to form a seal with the first sealing surface of the rotating component, and indents in one of the first sealing surface and the second sealing surface. The indents are configured to control a thickness of the fluid lubrication film between the first sealing surface and the second sealing surface (which creates a hydrodynamic pressure via turbulent vortex flow of the fluid, which in turn creates a lift separation force to form a gap within which the fluid is located) to minimize fluid flow into the gap without causing wear on the first sealing surface and the second sealing surface. At least two of the indents are at least partially aligned in the radial direction.

The seal assembly of the preceding paragraph can optionally include, additionally and/or alternatively, any one or more of the following features, configurations, and/or additional components:

The indents are in the first sealing surface of the rotating component.

The indents are in the second sealing surface of the stationary component.

At least one of the indents has a cross-sectional shape selected from a group consisting of a semicircle, rectangle, triangle, wedge, and semi-ellipse.

At least one of the indents has a surface shape selected from a group consisting of a circle, rectangle, triangle, ellipse, oval, and stadium.

A total surface area of all the indents is between 15 percent and 25 percent of a total surface area of one of the first sealing surface and the second sealing surface.

Each of the indents has a first surface shape midpoint in the radial direction and the first midpoints of at least two of the indents are aligned in the radial direction.

The indents are arranged into multiple radial columns.

Each of the indents has a second surface shape midpoint in a circumferential direction and the second midpoints of at least two of the indents are aligned in the circumferential direction.

The indents are arranged into multiple circumferential rows.

Adjacent rows of indents are offset in the circumferential direction.

Each of the indents has a depth that the indent extends into one of the first sealing surface and the second sealing surface, and a ratio of a surface area of each of the indents to a depth of that indent is between approximately 0.01 and 0.05.

The indents are formed on one of the first sealing surface and the second sealing surface using laser ablation.

The sealing assembly is part of a fuel pump in a gas turbine engine

A method of sealing a gap between a stationary component and a rotating component includes rotating the rotating component adjacent the stationary component with the rotating component having a first sealing surface positioned to interact with a second sealing surface on the stationary component. One of the first sealing surface and the second sealing surface includes indents with at least two of the indents being at least partially aligned in a radial direction. The method further includes sealing the gap between the first sealing surface and the second sealing surface due to the indents creating a hydrodynamic pressure by generating lift separation force to size the gap to allow a fluid between the first sealing surface and second sealing surface but minimize the fluid from flowing completely radially across the gap.

The method of the preceding paragraph can optionally include, additionally and/or alternatively, any one or more of the following features, configurations, steps, and/or additional components:

The fluid is fuel and the fuel is allowed to flow partially into the gap between the first sealing surface and the second sealing surface to provide a fluid film thickness but is prevented from flowing in a radial direction an entire distance across the first sealing surface and the second sealing surface.

At least one of the indents has a cross-sectional shape selected from a group consisting of a semicircle, rectangle, triangle, wedge, and semi-ellipse.

At least one of the indents has a surface shape selected from a group consisting of a circle, rectangle, triangle, ellipse, oval, and stadium.

A total surface area of all the indents is between 15 percent and 25 percent of a total surface area of one of the first sealing surface and the second sealing surface.

Each of the indents has a surface shape midpoint in a radial direction and the midpoints of at least two of the indents are aligned in the radial direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for preventing the flow of fluid, the seal assembly comprising:
    a rotating component having a first sealing surface;
    a stationary component coaxial with the rotating component and having a second sealing surface, the second sealing surface configured to form a seal with the first sealing surface of the rotating component;
    a biasing member configured to bias the stationary component towards the rotating component; and
    indents in one of the first sealing surface and the second sealing surface, the indents producing turbulent flow of the fluid to cause a separation force to counteract the biasing by the biasing member to control a width of a gap between the first sealing surface and the second sealing surface,
    wherein at least two of the indents are at least partially aligned in the radial direction,
    wherein a total surface area of all the indents is between 15 and 25 percent of a total surface area of one of the first sealing surface and the second sealing surface.

2. The seal assembly of claim 1, wherein the indents are in the first sealing surface of the rotating component.

3. The seal assembly of claim 1, wherein the indents are in the second sealing surface of the stationary component.

4. The seal assembly of claim 1, wherein at least one of the indents has a cross-sectional shape selected from a group consisting of a semicircle, rectangle, triangle, wedge, and semi-ellipse.

5. The seal assembly of claim 1, wherein at least one of the indents has a surface shape selected from a group consisting of a circle, rectangle, triangle, ellipse, oval, and stadium.

6. The seal assembly of claim 1, wherein each of the indents has a first surface shape midpoint in the radial direction and the first midpoints of at least two of the indents are aligned in the radial direction.

7. The seal assembly of claim 6, wherein the indents are arranged into multiple radial columns.

8. The seal assembly of claim 1, wherein each of the indents has a second surface shape midpoint in a circumferential direction and the second midpoints of at least two of the indents are aligned in the circumferential direction.

9. The seal assembly of claim 8, wherein the indents are arranged into multiple circumferential rows.

10. The seal assembly of claim 9, wherein adjacent rows of indents are offset in the circumferential direction.

11. The seal assembly of claim 1, wherein each of the indents has a depth that the indent extends into one of the first sealing surface and the second sealing surface, and a ratio of a surface area of each of the indents to a depth of that indent is between approximately 0.01 and 0.05.

12. The sealing assembly of claim 1, wherein the indents are formed on one of the first sealing surface and the second sealing surface using laser ablation.

13. A fuel pump in a gas turbine engine comprising the sealing assembly of claim 1.

14. A method of sealing a gap between a stationary component and a rotating component, the method comprising:
   biasing the stationary component towards the rotating component by a biasing member;
   rotating the rotating component adjacent the stationary component, the rotating component having a first sealing surface positioned to interact with a second sealing surface on the stationary component, wherein one of the first sealing surface and the second sealing surface includes indents with at least two of the indents being at least partially aligned in a radial direction; and
   sealing the gap between the first sealing surface and the second sealing surface due to the indents creating turbulent flow of the fluid to cause a separation force that counteracts the biasing by the biasing member to size the gap to allow a fluid between the first sealing surface and second sealing surface but prevent the fluid from flowing completely radially across the gap,
   wherein each of the indents has a depth that the indent extends into one of the first sealing surface and the second sealing surface and a ratio of a surface area of each of the indents to the depth of that indent is between approximately 0.01 and 0.05.

15. The method of claim 14, wherein the fluid is fuel and the fuel is allowed to flow partially into the gap between the first sealing surface and the second sealing surface to provide a fluid film thickness but is prevented from flowing in a radial direction an entire distance across the first sealing surface and the second sealing surface.

16. The method of claim 14, wherein at least one of the indents has a cross-sectional shape selected from a group consisting of a semicircle, rectangle, triangle, wedge, and semi-ellipse.

17. The method of claim 14, wherein at least one of the indents has a surface shape selected from a group consisting of a circle, rectangle, triangle, ellipse, oval, and stadium.

18. The method of claim 14, wherein a total surface area of all the indents is between 15 percent and 25 percent of a total surface area of one of the first sealing surface and the second sealing surface.

19. The method of claim 14, wherein each of the indents has a surface shape midpoint in a radial direction and the midpoints of at least two of the indents are aligned in the radial direction.

* * * * *